US010682724B2

United States Patent
Sigler et al.

(10) Patent No.: US 10,682,724 B2
(45) Date of Patent: Jun. 16, 2020

(54) RESISTANCE SPOT WELDING OF ALUMINUM-TO-ALUMINUM, ALUMINUM-TO-STEEL, AND STEEL-TO-STEEL IN A SPECIFIED SEQUENCE AND USING A COVER

(71) Applicant: GM GLOBAL TECHNOLOGY OPERATIONS LLC, Detroit, MI (US)

(72) Inventors: David R. Sigler, Shelby Township, MI (US); Blair E. Carlson, Ann Arbor, MI (US); Michael J. Karagoulis, Okemos, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 396 days.

(21) Appl. No.: 15/491,566

(22) Filed: Apr. 19, 2017

(65) Prior Publication Data
US 2017/0297138 A1 Oct. 19, 2017

Related U.S. Application Data

(60) Provisional application No. 62/324,398, filed on Apr. 19, 2016.

(51) Int. Cl.
*B23K 11/20* (2006.01)
*B23K 11/11* (2006.01)
(Continued)

(52) U.S. Cl.
CPC .............. *B23K 11/20* (2013.01); *B23K 11/115* (2013.01); *B23K 11/166* (2013.01);
(Continued)

(58) Field of Classification Search
CPC ... B23K 11/115; B23K 2103/20; B23K 11/20; B23K 11/3009; B23K 35/0205;
(Continued)

(56) References Cited

U.S. PATENT DOCUMENTS 5,302,797 A 4/1994 Yasuyama et al.
5,304,769 A 4/1994 Ikegami et al.
(Continued)

FOREIGN PATENT DOCUMENTS

CN 1946506 4/2007
CN 102059439 5/2011
(Continued)

OTHER PUBLICATIONS

Wang et al., "Interface microstructure and weld strength of steel/aluminum alloy joints by resistance spot welding," Applied Mechanics and Materials, vols. 117-119 (2012) pp. 1895-1899.
(Continued)

*Primary Examiner* — Serkan Akar
*Assistant Examiner* — Chris Q Liu
(74) *Attorney, Agent, or Firm* — Reising Ethington P.C.

(57) ABSTRACT

A series of many electrical resistance spot welds is to be formed in members of an assembled, but un-joined, body that presents workpiece stack-ups of various combinations of metal workpieces including all aluminum workpieces, all steel workpieces, and a combination of aluminum and steel workpieces. A pair of spot welding electrodes, each with a specified weld face that includes oxide-disrupting features, is used to form the required numbers of aluminum-to-aluminum spot welds, aluminum-to-steel spot welds, and steel-to-steel spot welds. A predetermined sequence of forming the various spot welds may be specified for extending the number of spot welds that can be made before the weld faces must be restored. And, during at least one of the aluminum-to-steel spot welds, a cover is inserted between the weld face of one of the welding electrodes and a side of a workpiece stack-up that includes the adjacent aluminum and steel workpieces.

13 Claims, 4 Drawing Sheets

(51) Int. Cl.
| | |
|---|---|
| *B23K 11/31* | (2006.01) |
| *B23K 11/30* | (2006.01) |
| *B23K 11/24* | (2006.01) |
| *B23K 11/18* | (2006.01) |
| *B23K 11/16* | (2006.01) |
| *B23K 103/04* | (2006.01) |
| *B23K 103/10* | (2006.01) |
| *B23K 103/20* | (2006.01) |
| *B23K 101/00* | (2006.01) |
| *B23K 101/18* | (2006.01) |

(52) U.S. Cl.
CPC ............ *B23K 11/185* (2013.01); *B23K 11/24* (2013.01); *B23K 11/3009* (2013.01); *B23K 11/3063* (2013.01); *B23K 11/315* (2013.01); *B23K 2101/006* (2018.08); *B23K 2101/185* (2018.08); *B23K 2103/04* (2018.08); *B23K 2103/10* (2018.08); *B23K 2103/20* (2018.08)

(58) Field of Classification Search
CPC .............. B23K 11/185; B23K 11/3063; B23K 2103/04; B23K 11/166; B23K 2101/006; B23K 2101/18; B23K 2101/34; B23K 2103/10; B23K 11/14; B23K 11/24; B23K 11/34; B23K 35/0261; B23K 11/0033; B23K 11/16; B23K 11/163; B23K 11/256; B23K 11/30; B23K 11/3018; B23K 11/314; B23K 11/36; B23K 15/0093; B23K 2103/02; B23K 2103/08; B23K 26/323; B23K 35/002; B23K 35/004; B23K 35/222; B23K 35/302; B23K 9/232
USPC ........... 219/91.2, 119, 118, 93, 117.1, 86.22, 219/91.22, 121.14, 121.64, 136, 137 R, 219/86.1, 86.23, 86.31, 87, 91.23, 92, 94
See application file for complete search history.

(56) References Cited

U.S. PATENT DOCUMENTS

| | | | |
|---|---|---|---|
| 5,783,794 A * | 7/1998 | Oikawa | B23K 11/115 |
| | | | 219/118 |
| 6,037,559 A | 3/2000 | Okabe et al. | |
| 7,850,059 B2 | 12/2010 | Kobayashi et al. | |
| 7,935,908 B2 | 5/2011 | Nakagawa et al. | |
| 7,951,465 B2 | 5/2011 | Urushihara et al. | |
| 7,984,840 B2 | 7/2011 | Kobayashi et al. | |
| 8,020,749 B2 | 9/2011 | Kobayashi et al. | |
| 8,058,584 B2 | 11/2011 | Miyamoto et al. | |
| 8,436,269 B2 * | 5/2013 | Sigler | B23B 5/166 |
| | | | 219/119 |
| 8,487,206 B2 | 7/2013 | Urushihara et al. | |
| 8,502,105 B2 * | 8/2013 | Tanaka | B23K 11/115 |
| | | | 219/86.22 |
| 9,676,065 B2 | 6/2017 | Sigler et al. | |
| 2005/0218121 A1 | 10/2005 | Hayashi et al. | |
| 2005/0247679 A1 | 11/2005 | Wang | |
| 2007/0212565 A1 | 9/2007 | Urushihara et al. | |
| 2009/0255908 A1 | 10/2009 | Sigler et al. | |
| 2011/0097594 A1 | 4/2011 | Tanaka et al. | |
| 2012/0021240 A1 | 1/2012 | Urushihara et al. | |
| 2013/0189023 A1 | 7/2013 | Spinella | |
| 2013/0263638 A1 | 10/2013 | Gugel et al. | |
| 2014/0305912 A1 | 10/2014 | Taniguchi et al. | |
| 2014/0360986 A1 | 12/2014 | Sigler et al. | |
| 2015/0053654 A1 | 2/2015 | Sigler et al. | |
| 2015/0053655 A1 | 2/2015 | Sigler et al. | |
| 2015/0083693 A1 | 3/2015 | Schroth et al. | |
| 2015/0096961 A1 * | 4/2015 | Carlson | B23K 11/20 |
| | | | 219/91.2 |
| 2015/0096962 A1 | 4/2015 | Sigler et al. | |
| 2015/0231729 A1 | 8/2015 | Yang et al. | |
| 2015/0231730 A1 | 8/2015 | Sigler et al. | |
| 2015/0352658 A1 | 12/2015 | Yang et al. | |
| 2015/0352659 A1 | 12/2015 | Sigler et al. | |
| 2016/0016252 A1 | 1/2016 | Edwards, II | |
| 2016/0158874 A1 | 6/2016 | Wang et al. | |
| 2016/0279732 A1 | 9/2016 | Sigler et al. | |
| 2016/0288242 A1 | 10/2016 | Sigler et al. | |
| 2016/0346865 A1 | 12/2016 | Sigler et al. | |
| 2017/0008118 A1 | 1/2017 | Yang et al. | |
| 2017/0106466 A1 | 4/2017 | Sigler et al. | |
| 2017/0157697 A1 | 6/2017 | Yang et al. | |
| 2017/0225262 A1 | 8/2017 | Sigler et al. | |
| 2017/0225263 A1 | 8/2017 | Sigler et al. | |
| 2017/0232548 A1 | 8/2017 | Carlson et al. | |
| 2017/0252853 A1 | 9/2017 | Wang et al. | |
| 2017/0282303 A1 | 10/2017 | Wang et al. | |
| 2017/0291246 A1 | 10/2017 | Sigler et al. | |
| 2017/0291247 A1 | 10/2017 | Sigler et al. | |
| 2017/0291248 A1 | 10/2017 | Sigler et al. | |
| 2017/0297134 A1 | 10/2017 | Sigler et al. | |
| 2017/0297135 A1 | 10/2017 | Sigler et al. | |
| 2017/0297136 A1 | 10/2017 | Brown et al. | |
| 2017/0297137 A1 | 10/2017 | Perry et al. | |
| 2017/0304925 A1 | 10/2017 | Sigler et al. | |
| 2017/0304928 A1 | 10/2017 | Sigler et al. | |
| 2017/0361392 A1 | 12/2017 | Sigler et al. | |

FOREIGN PATENT DOCUMENTS

| | | |
|---|---|---|
| CN | 102114574 | 7/2011 |
| JP | 11342477 | 12/1999 |
| JP | 2011224578 | 11/2011 |
| JP | 2013151017 | 8/2013 |

OTHER PUBLICATIONS

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (2011) No. 2 pp. 1-6.

Weihua et al., "Interfacial characterization of resistance spot welded joint of steel and aluminum alloy," China Welding, vol. 19 (2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vols. 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

(56) References Cited

OTHER PUBLICATIONS

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (2011) No. 5 pp. 967-973.
English translation of CN 102059439 to Mazda Motor (published May 18, 2011).
English translation JP 2011224578 to Kobe Steel (published Nov. 10, 2011).
English translation of JP2013151017 to Mazda Motor (published Aug. 8, 2013).
Haselhuhn et al., U.S. Appl. No. 15/807,219 entitled "Electrode Weld Face Design," filed Nov. 8, 2017.
Sigler et al., U.S. Appl. No. 15/907,996 entitled "Improving Mechanical Performance of Al-Steel Weld Joints by Limiting Steel Sheet Deformation," filed Feb. 28, 2018.
Sigler et al., U.S. Appl. No. 15/920,784 entitled "Resistance Spot Welding Workpiece Stack-Ups Having a Steel Workpiece and an Aluminum Workpiece with a Steel Plate," filed Mar. 14, 2018.
Sigler et al., U.S. Appl. No. 15/976,163 entitled "Multi-Step Direct Welding of an Aluminum-Based Workpiece to a Steel Workpiece," filed May 10, 2018.
Yang et al., U.S. Appl. No. 15/992,748 entitled "Electrode for Resistance Spot Welding of Dissimilar Metals," filed May 30, 2018.

* cited by examiner

RESISTANCE SPOT WELDING OF ALUMINUM-TO-ALUMINUM, ALUMINUM-TO-STEEL, AND STEEL-TO-STEEL IN A SPECIFIED SEQUENCE AND USING A COVER

CROSS REFERENCE TO RELATED APPLICATION(S)

This application claims the benefit of U.S. Provisional Application No. 62/324,398 filed on Apr. 19, 2016. The entire contents of the aforementioned provisional application are incorporated herein by reference.

TECHNICAL FIELD

The manufacture of future automotive body structures, and other industrial products, may require a series of many resistance spot welds to be formed in an organized, but un-joined, assembly of pre-formed aluminum workpieces and steel workpieces. In transforming the un-joined assembly into an integrated structure, many aluminum-to-aluminum, aluminum-to-steel, and steel-to-steel spot welds may be required. A combination of a welding sequence and electrode-covering processes are disclosed that permit a substantial number of welds to be formed before with the same welding electrodes on a single weld gun.

INTRODUCTION

In the manufacture of an automobile body, a common practice is to collect individual structural component members of a vehicle body structure such as floor members, roof members, pillars, engine compartment members, and trunk compartment members, among others. Each of these structural component members may be a stamped or otherwise formed metal workpiece or workpieces of a predetermined shape and contour. The individual structural component members are then assembled and supported in a predetermined, un-joined configuration using suitable fixturing to present flanges or other bonding regions of the individual structural members for joining into a unitary vehicle body structure. Many electrical resistance spot welds may be formed using one or more pairs of resistance welding electrodes to progressively join the assembled structural component members into the unitary vehicle body structure in a manufacturing setting. The number of spot welds needed to form the unitary vehicle structure may be quite large depending on the sizes, shapes, and number of the individual component members. At this stage of vehicle body construction, the unitary vehicle body structure often does not include closure members such as doors, a deck lid, or a hood. In the automotive field, such a unitary vehicle body structure is sometimes termed a "body in white."

In previous practices, the structural component members of the vehicle body structure were arranged so that spot welds would be formed between metal workpieces of similar base metal compositions, e.g., steel-to-steel or aluminum-to-aluminum. What is more, due to the materially different properties of steel and aluminum, their possible surface coatings, and the individualized techniques that have been developed over the years for spot welding steels and aluminums, a typical manufacturing set-up calls for dedicated weld guns on the manufacturing floor—with each weld gun being dedicated to a workpiece stack-up of steel workpieces or a workpiece stack-up of aluminum workpieces—or a procedure for using more than one weld gun on a robot by physically switching weld guns each time a workpiece stack-up with a new combination of metal workpieces (relative to the last stack-up) has to be spot welded. And, for those structural component members that present an aluminum workpiece and a steel workpiece in need of joining, mechanical fasteners such self-piercing rivets would typically be used although recent technological advances have made resistance spot welding a viable and dependable option for joining together aluminum and steel metal workpieces.

Recently, there has been interest in developing the capability to spot weld an aluminum workpiece to a steel workpiece amongst an overall manufacturing process that also includes spot welding aluminum workpieces to one or more other aluminum workpieces and steel workpieces to one or more other steel workpieces, particularly in the construction of a body-in-white during current automobile manufacturing processes. The construction of the body-in-white, however, is not the only scenario in which resistance spot welding diverse combinations of metal workpieces is a desirable manufacturing practice. Indeed, within the automotive industry, resistance spot welding may be used to fabricate the vehicle structural members themselves as well as vehicle closure members such as doors, hoods, trunk lids, and lift gates, and circumstances may exist in which different combinations of metal workpieces would need to be spot welded in a manufacturing setting when assembling those types of members prior to their incorporation into a body-in-white. Moreover, other industries that typically use resistance spot welding on a manufacturing scale are also interested in developing effective and practical welding procedures that can accommodate the use of aluminum and steel workpieces and various stacked combinations of those workpieces. Those other industries include the aviation, maritime, railway, and building construction industries, to name but a few.

Resistance spot welding is a joining technique that relies on the resistance to the flow of an electrical current through overlapping metal workpieces and across their faying interface(s) to generate the heat needed for welding. To carry out such a welding process, a set of opposed spot welding electrodes is clamped at aligned spots on opposite sides of the workpiece stack-up, which typically includes two or three metal workpieces arranged in a lapped configuration. Electrical current is then passed through the metal workpieces from one welding electrode to the other. Resistance to the flow of this electrical current generates heat within the metal workpieces and at their faying interface(s). When the workpiece stack-up includes similar metal workpieces, such as two or more overlapping aluminum workpieces or two or more overlapping steel workpieces, the generated heat creates a molten weld pool that grows to consume the faying interface(s) and thus extends through all or part of each of stacked metal workpieces. In that regard, each of the similarly-composed metal workpieces contributes material to the comingled molten weld pool. Upon termination of the passage of electrical current through the workpiece stack-up, the molten weld pool solidifies into a weld nugget that fusion welds the adjacent metal workpieces together.

The resistance spot welding process proceeds somewhat differently when the workpiece stack-up includes an aluminum workpiece and a steel workpiece that overlap and confront to establish a faying interface, as well as possibly one or more flanking aluminum and/or one or more flanking steel workpieces. Under these circumstances, the heat generated within the bulk workpiece material and at the faying interface of the aluminum and steel workpiece creates a molten weld pool within the aluminum workpiece. The faying surface of the steel workpiece remains solid and intact and, consequently, the steel workpiece does not melt and comingle with the molten weld pool on account of its much higher melting point, although elements from the steel workpiece, such as iron, may diffuse into the molten weld pool in amounts of approximately 1 wt % or less. This molten weld pool wets the confronting faying surface of the steel workpiece and, upon cessation of the current flow, solidifies into a weld joint that weld bonds or brazes the two dissimilar workpieces together. Current manufacturing practices do not have structured processed in place to resistance spot weld workpiece stack-ups of aluminum workpieces, workpiece stack-ups that include an aluminum workpiece and an overlapping adjacent steel workpiece, and workpiece stack-ups of steel workpieces using the same gun with the same welding electrodes.

SUMMARY

A method of resistance spot welding workpiece stack-ups of different combinations of metal workpieces with a single weld gun using the same set of welding electrodes may include several steps according to one embodiment of the present disclosure. In one step, a weld gun is provided that carries a set of opposed welding electrodes. Each of the opposed welding electrodes has a weld face that comprises oxide-disrupting structural features. In another step, a set of aluminum-to-aluminum spot welds is formed. Each of the aluminum-to-aluminum spot welds comprises an aluminum nugget that fusion welds two or more aluminum workpieces together. In still another step, a set of aluminum-to-steel spot welds is formed. Each of the aluminum-to-steel spot welds comprises a weld joint contained within an aluminum workpiece that weld bonds the aluminum workpiece to an adjacent steel workpiece. Moreover, when forming at least one of the set of aluminum-to-steel spot welds, a cover is inserted between a weld face of one of the opposed welding electrodes and a side of a workpiece stack-up that includes the aluminum workpiece and the adjacent steel workpiece. The inserted cover isolates the weld face from the side of the workpiece stack-up during current flow through the workpiece stack-up. In another step, a set of steel-to-steel spot welds is formed. Each of steel-to-steel spot welds comprises a steel nugget that fusion welds two or more steel workpieces together.

The aforementioned method may include additional steps and/or features. For example, the oxide-disrupting structural features on one or both of the weld faces of the opposed welding electrodes may comprise a series of upstanding circular ridges that are centered about and surround a central axis of the weld face and which project outwardly from a base weld face surface of the weld face. The series of upstanding circular ridges may include anywhere from two circular ridges to ten circular ridges starting from an innermost ridge that immediately surrounds the central axis of the weld face and ending with an outermost ridge that is farthest from the central axis of the weld face. As another example, the oxide-disrupting structural features on one or both of the weld faces of the opposed welding electrodes may comprise a series of recessed circular grooves that are centered about and surround a central axis of the weld face and which intrude inwardly into a base weld face surface of the weld face. The series in recessed grooves may include anywhere from two circular grooves to ten circular grooves starting from an innermost groove that immediately surrounds the central axis of the weld face and ending with an outermost groove that is farthest from the central axis of the weld face.

In one particular practice of the aforementioned method, the set of opposed welding electrodes includes a first welding electrode having a first weld face and a second welding electrode having a second weld face. The first weld face is pressed against the cover, which is inserted between the first weld face and an aluminum workpiece surface at a first side of the workpiece stack-up, and the second weld face being pressed against a steel workpiece surface at a second side of the workpiece stack-up during formation of each of the at least one aluminum-to-steel spot weld. Under these circumstances, the set of aluminum-to-aluminum spot welds may be formed first, the set of aluminum-to-steel spot welds may be formed after the set of aluminum-to-aluminum spot welds, and the set of steel-to-steel spot welds may be formed after the set of aluminum-to-steel spot welds. As another option, the set of aluminum-to-aluminum spot welds may be formed first, the set of steel-to-steel spot welds may be formed after the set of aluminum-to-aluminum spot welds, and the set of aluminum-to-steel spot welds may be formed after the set of steel-to-steel spot welds provided that the cover is inserted between the first weld face of the first welding electrode and the aluminum workpiece surface at the first side of the workpiece stack-up to isolate the first weld face from the aluminum workpiece surface during formation of each of the set of aluminum-to-steel spot welds.

The cover used in the spot weld sequencing just described is subject to variability. In one implementation, the cover may be a cover plate constructed of material that is more electrically resistive than the first welding electrode and the aluminum workpiece that is bonded to the steel workpiece by the at least one aluminum-to-steel spot weld. To that end, the cover plate may be constructed from a low carbon steel, molybdenum or a molybdenum-based alloy, niobium or a niobium-based alloy, tungsten or a tungsten-based alloy, or a refractory metal composite. In another implementation, the cover plate may be constructed from a copper alloy that is less electrically resistive than the aluminum workpiece that is bonded to the steel workpiece by the at least one aluminum-to-steel spot weld, yet is more electrically resistive than the first welding electrode.

In another particular practice of the aforementioned method, the set of opposed welding electrodes includes a first welding electrode having a first weld face and a second welding electrode having a second weld face. The first weld face is pressed against an aluminum workpiece surface at a first side of the workpiece stack-up and the second weld face is pressed against the cover, which is inserted between the second weld face and the steel workpiece surface at a second side of the workpiece stack-up, during formation of the at least one aluminum-to-steel spot weld. Under these circumstances, the set of aluminum-to-aluminum spot welds may be formed first, the set of aluminum-to-steel spot welds may be formed after the set of aluminum-to-aluminum spot welds, and the set of steel-to-steel spot welds may be formed after the set of aluminum-to-steel spot welds. As another option, the set of aluminum-to-steel spot welds is formed first, the set of aluminum-to-aluminum spot welds is formed after the set of aluminum-to-steel spot welds, and the set of steel-to-steel spot welds is formed after the set of aluminum-to-aluminum spot welds provided that the cover is inserted between the second weld face of the second welding electrode and the steel workpiece surface at the second side of the workpiece stack-up to isolate the second weld face from the steel workpiece surface during formation of each of the set of aluminum-to-steel spot welds.

The cover used in the spot weld sequencing just described is subject to variability. In one implementation, the cover may be a cover plate that includes a planar base and an outwardly extending dome portion. In use, the second weld face of the second welding electrode is pressed against the planar base and the outwardly extending dome portion is pressed against the steel workpiece surface of the second side of the workpiece stack-up. The outwardly extending dome portion of the cover plate may have a diameter that is less than a diameter of the second weld face of the second welding electrode. Furthermore, as an example of the dome shape, the outwardly extending dome portion may be spherically shaped with a radius of curvature that ranges from 4 mm to 12 mm. The cover may be constructed from a copper material.

The method of the present disclosure may have still other features or applications. For instance, each of the set of aluminum-to-aluminum spot welds, the set of aluminum-to-steel spot welds, and the set of steel-to-steel spot welds may be formed throughout a unitary body-in-white structure of an automotive passenger vehicle. As another example, the method of the present disclosure may further call for the periodic restoration of each of the weld faces of the set of opposed welding electrodes. Still further, the cover may be inserted between the weld face of one of the opposed welding electrodes and the side of a workpiece stack-up by a rotating an arm that carries the cover about a pivot axis so as to bring the cover into an inserted position between the weld face of one of the opposed welding electrodes and the side of the workpiece stack-up.

DETAILED DESCRIPTION

This disclosure pertains to the manufacture of component members and a unitary welded structure constructed from those component members using resistance spot welding. In accordance with the processes of the disclosure, the component members and thus the eventual unitary welded structure may include aluminum workpieces and steel workpieces that are stacked up in various combinations (e.g., aluminum-to-aluminum, steel-to-steel, aluminum-to-steel, etc.) in preparation for spot welding. The component members may be vehicle structural component members for automotive passenger vehicles or they may be different types of members suited for other manufactured structures. In the case of automotive passenger vehicles, the vehicle structural members may comprise, for example, floor panels, side pillars, roof panels for the passenger compartment of the vehicle, and structural members for the engine compartment and the trunk of the vehicle. A number of opportunities may thus exist to spot weld a workpiece stack-up comprised of steel workpieces, a workpiece stack-up comprised of aluminum workpieces, and a workpiece stack-up comprised of some combination of steel and aluminum workpieces. The disclosed method allows for each of these types of workpiece stack-ups to be spot welded together with a single weld gun and a common pair of welding electrodes. Certain vehicle closure members may also be spot welded according to practices of the present disclosure before and/or during their installation on a body-in-white.

Figure 1:
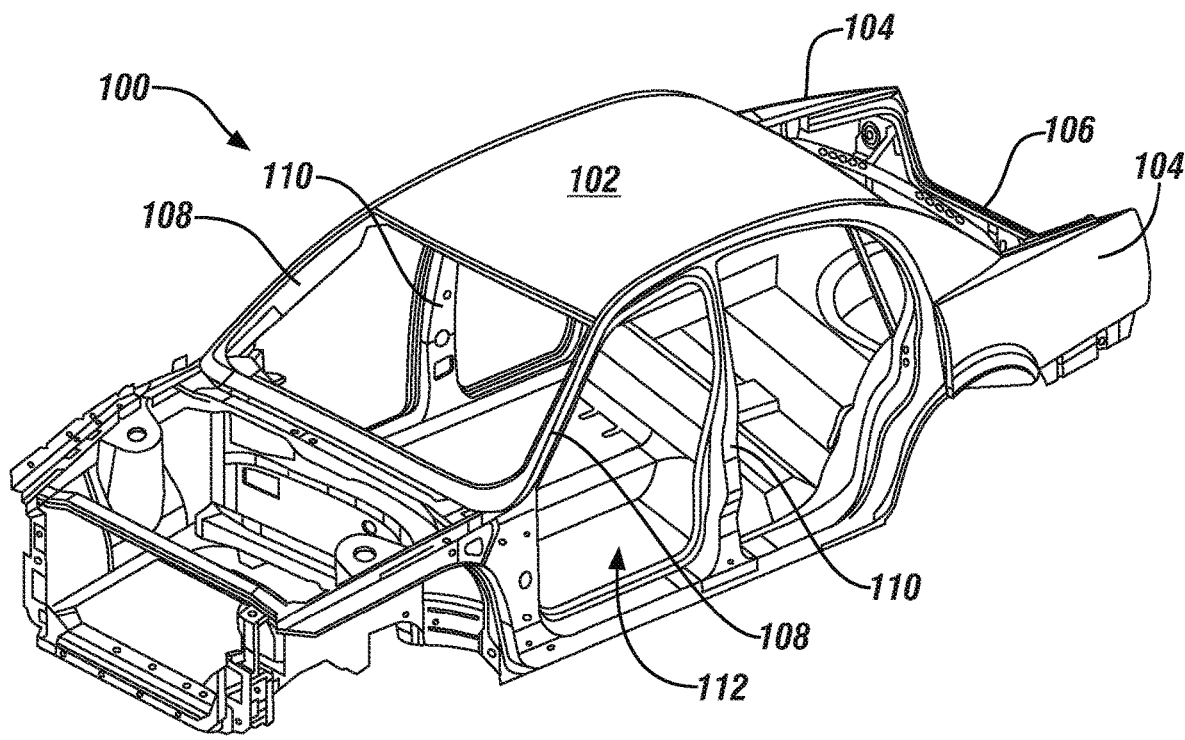
FIG. 1 illustrates a multi-component integrated assembly in the form of an automobile body-in-white that, in accordance with one embodiment of the present disclosure, includes both aluminum workpieces and steel workpieces and may be secured together from a fixture of individual vehicle body members by resistance spot welding.

FIG. 1 presents an illustration of a body-in-white 100 of a passenger vehicle. In FIG. 1, several structural component members such as a roof 102, rear quarter panels 104, and a rear wall 106 of the trunk may, for example, be formed of one or more aluminum workpieces while other structural component members such as A pillars 108, B pillars 110, floor members 112, and other related underneath structural members may, for example, be formed of one or more steel workpieces. The shapes, arrangement, and composition of the structural component members may vary between vehicle designs. In each vehicle, however, these members must be joined together into a strong unitary vehicle body structure known as a body-in-white. In certain practices of this disclosure, the individual pre-formed structural component members are assembled in their intended positions in a suitable fixturing device in preparation for the formation of a sequence of many spot welds that join the individual components to each other.

In general, and in order to progress through the many needed spot welds, the various individual pre-formed structural component members are assembled and supported in a suitable fixture or fixtures that hold the component members to be joined in their precise three-dimensional relationship. The fixtured assembly will be brought to a spot welding apparatus or the welding apparatus will be brought to the fixtured assembly. A weld gun 10 (partially shown in FIG. 2) carried on a welding robot or other controllable device (not shown) is then suitably positioned adjacent to the fixtured assembly in preparation for spot welding activity. The weld gun 10 has a first gun arm 12 and a second gun arm 14 that are movable relative to each other, and the motions of the weld gun 10 and its gun arms 12, 14 is programmed using suitable computer programming to sequentially move the gun arms 12, 14 so as to clamp a set of opposed first and second welding electrodes 16, 18 at numerous spot weld locations 20 spread across multiple workpiece stack-ups 22. Indeed, at each weld locations, first and second weld faces 24, 26 of the first and second welding electrodes, respectively, are pressed against opposite first and second sides 28, 30 of the workpiece stack-up 22 and electrical current is momentarily passed between the weld faces 24, 26. The opposed welding electrodes 16, 18 are thus advanced from one intended spot weld location 20 to the next until each of the many required spot welds has been formed and the body-in-white is constructed.

Figure 2:
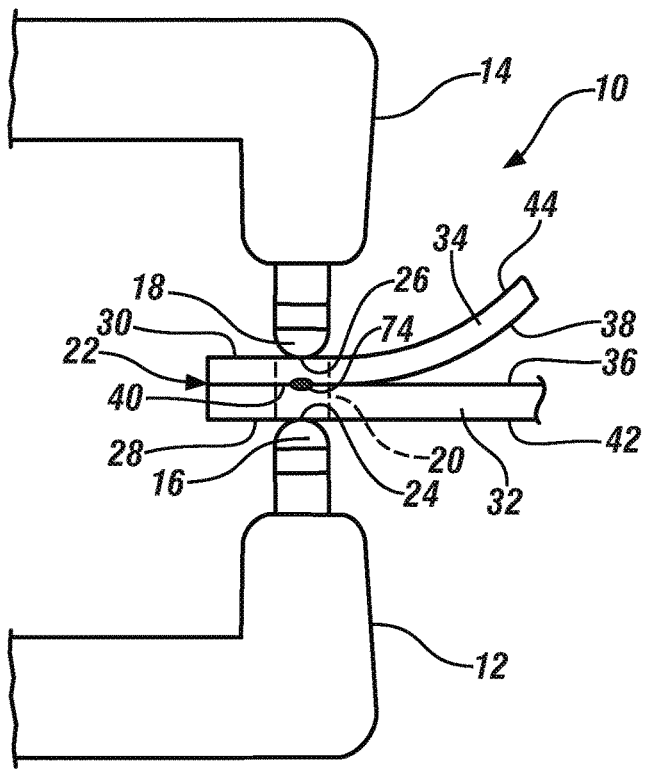
FIG. 2 is a side view of a resistance spot welding assembly that includes a pair of opposed welding electrodes in preparation for spot welding a workpiece stack-up that includes a first metal workpiece and an overlapping adjacent second metal workpiece according to one embodiment of the present disclosure.

The workpiece stack-up 22 being welded in FIG. 2 is representative of the various types of workpieces that may be acted on by the weld gun 10. As shown here, the workpiece stack-up 22 includes at least a first metal workpiece 32 and a second metal workpiece 34. A faying surface 36 of the first metal workpiece 32 and a confronting faying surface 38 of the second metal workpiece 34 overlap and contact one another to establish a faying interface 40 between the workpieces 32, 34. The contact experienced between the workpiece faying surfaces 36, 38 at their faying interface 40 may be direct contact or indirect contact such as, for example, when a weld through adhesive or sealer or other thin intermediary material is present. The illustrated portions of the workpieces 32, 34 may, for example, be at the periphery of the workpiece stack-up 22 where a series of resistance spot welds are to be formed in spaced-apart alignment along the overlapping peripheral edges. As such, the term "faying interface" as used herein encompasses any overlapping relationship of the faying surfaces 36, 38 of the first and second metal workpieces 32, 34 in which spot welding can be practiced to join together the workpieces 32, 34.

Depending on the constitution of the workpiece stack-up 22 and its location within the fixtured assembly, each of the first metal workpiece 32 and the second metal workpiece 34 may be an aluminum workpiece or a steel workpiece. In that regard, the overlapping and adjacent first and second metal workpieces 32, 34 may each be aluminum workpieces, may each be steel workpieces, or one of the metal workpieces 32, 34 may be an aluminum workpiece and the other of the metal workpieces 32, 34 may be a steel workpiece. The workpiece stack-up 22 may include only the overlapping and adjacent first and second metal workpieces 32, 34 (i.e., a "2T" stack-up) such that an exposed back surface 42 of the first metal workpiece 32 provides the first side 28 of the stack-up 22 and an exposed back surface 44 of the second metal workpiece 34 provides the second side 30 of the stack-up 22. In other embodiments, however, the workpiece stack-up 22 may include one or more additional metal workpieces (e.g., a "3T" stack-up or a "4T" stack-up) so long as any additional metal workpiece that may be present overlaps and lies adjacent to whichever of the first or second metal workpiece 24, 26 falls within the same class of base metal. Accordingly, no matter how the workpiece stack-up is constructed, the first side 28 of the workpiece stack-up 22 will be provided by either an aluminum workpiece surface or a steel workpiece surface and, likewise, the second side 30 of the workpiece stack-up 22 will be provided by either an aluminum workpiece surface or a steel workpiece surface To be sure, any of the following combinations of aluminum and/or steel workpieces may constitute the workpiece stack-up: aluminum-aluminum, steel-steel, aluminum-steel, steel-aluminum, aluminum-aluminum-aluminum, steel-steel-steel, aluminum-aluminum-steel, aluminum-steel-steel, steel-steel-aluminum, steel-aluminum-aluminum, aluminum-aluminum-aluminum-aluminum, steel-steel-steel-steel, aluminum-aluminum-aluminum-steel, aluminum-aluminum-steel-steel, aluminum-steel-steel-steel, steel-steel-steel-aluminum, steel-steel-aluminum-aluminum, and steel-aluminum-aluminum-aluminum. When more workpieces are present in addition to the first and second metal workpieces 34, 36, a faying interface of the same type described above is established between each adjacent pair of workpieces in the workpiece stack-up 22.

An aluminum workpiece that may be included in the workpiece stack-up 22 in any workpiece that includes an aluminum substrate, either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer of a refractory oxide material comprised of aluminum oxide compounds and possibly other oxide compounds as well, such as magnesium oxide compounds if, for example, the aluminum substrate is an aluminum-magnesium alloy. Such a refractory oxide material may be a native oxide coating that forms naturally when the aluminum substrate is exposed to air and/or an oxide layer created during exposure of the aluminum substrate to elevated temperatures during manufacture, e.g., a mill scale. The aluminum substrate may also be coated with a layer of zinc, tin, or a metal oxide conversion coating comprised of oxides of titanium, zirconium, chromium, or silicon, as described in US2014/0360986. The surface layer may have a thickness ranging from 1 nm to 10 μm m and may be present on each side of the aluminum substrate. Taking into account the thickness of the aluminum substrate and any surface coating that may be present, the aluminum workpiece may have a thickness that ranges from 0.3 mm to about 6.0 mm, or more narrowly from 0.5 mm to 3.0 mm, at least at the location 20.

The aluminum substrate of the aluminum workpiece may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si—Mg aluminum die casting alloy. The aluminum substrate may further be employed in a variety of tempers including annealed (O), strain hardened (H), and solution heat treated (T), if desired. The term "aluminum workpiece" as used herein thus encompasses unalloyed aluminum and a wide variety of aluminum alloys, whether coated or uncoated, in different spot-weldable forms including wrought sheet layers, extrusions, forgings, etc., as well as castings.

A steel workpiece that may be included in the workpiece stack-up 20 is any workpiece that includes a steel substrate from any of a wide variety of grades and strengths, either coated or uncoated. The steel substrate may be hot-rolled or cold-rolled and may be composed of steel such as mild steel, interstitial-free steel, bake-hardenable steel, high-strength low-alloy (HSLA) steel, dual-phase (DP) steel, complexphase (CP) steel, martensitic (MART) steel, transformation induced plasticity (TRIP) steel, twining induced plasticity (TWIP) steel, and boron steel such as when the steel workpiece 14 includes press-hardened steel (PHS). Preferred compositions of the steel substrate, however, include mild steel, dual phase steel, and boron steel used in the manufacture of press-hardened steel. Those three types of steel have ultimate tensile strengths that, respectively, range from 150 MPa to 500 MPa, from 500 MPa to 1100 MPa, and from 1200 MPa to 1800 MPa.

The steel substrate, if coated, preferably includes a surface layer of zinc (galvanized), a zinc-iron alloy (galvanneal), an electrodeposited zinc-iron alloy, a zinc-nickel alloy, nickel, aluminum, an aluminum-magnesium alloy, an aluminum-zinc alloy, or an aluminum-silicon alloy, any of which may have a thickness of up to 50 μm and may be present on each side of the steel substrate. Taking into account the thickness of the steel substrate and any coating that may be present, the steel workpiece may have a thickness that ranges from 0.3 mm and 6.0 mm, or more narrowly from 0.6 mm to 2.5 mm, at least at the weld location 20. The term "steel workpiece" as used herein thus encompasses a wide variety of spot-weldable steels, whether coated or uncoated, of different strengths and grades.

Figure 6:
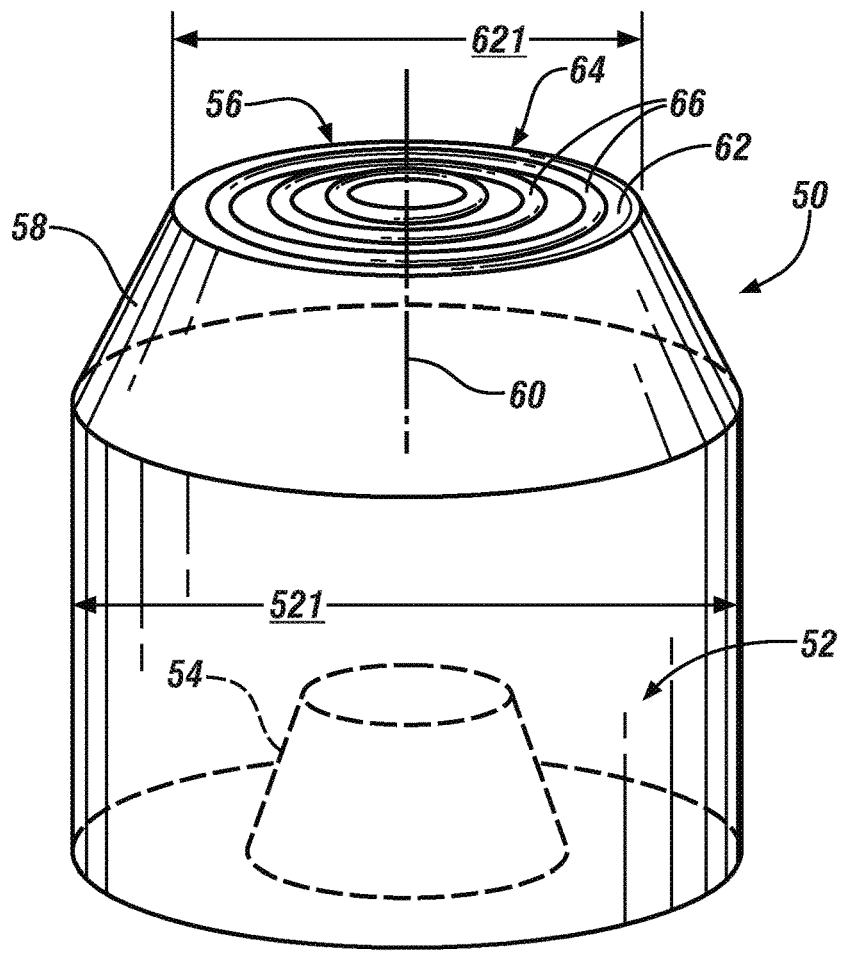
FIG. 6. is a perspective view of a welding electrode that embodies a particular weld face design (the MRD weld face design) and that represents the structure of each of the opposed welding electrodes carried by the weld gun shown in FIG. 2 according to one embodiment of the present disclosure.
Figure 7:
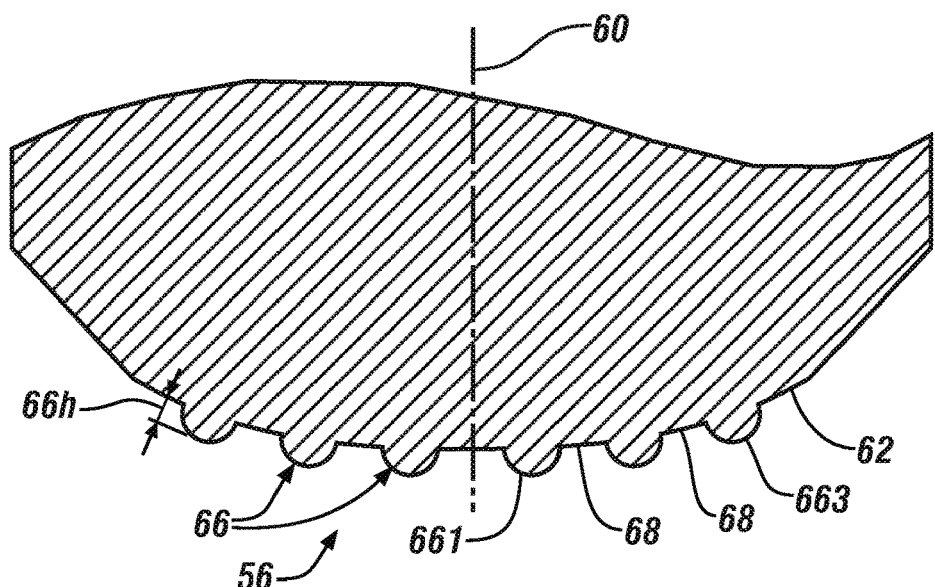
FIG. 7 is a magnified cross-sectional view of the weld face of the particular welding electrode illustrated in FIG. 6.

Each of the welding electrodes 16, 18 is specifically designed to deliver current into and out of both aluminum workpieces and steel workpieces. In particular, the design and construction of each of the welding electrodes 16, 18, which is represented generally as reference numeral 50 and 50' in FIGS. 6-9, blends various features from conventional steel welding electrodes and conventional aluminum welding electrodes in order to arrive at an electrode configuration that can tolerate pressed engagement and electrical communication with both types of workpieces. Referring now to FIGS. 6-7, the welding electrode 50 (which is representative of each of the welding electrodes 16, 18 in FIG. 2) according to a preferred embodiment includes a cylindrical body 52 with an internal hollow volume portion 54 accessible at one of its ends and a weld face 56 disposed on the opposite end either directly or by way of a frustoconical or truncated spherical transition nose 58. An outside diameter 521 of the electrode body 52 may range, for example, from 12 mm to 22 mm, or more narrowly from 16 mm to 20 mm. The hollow internal volume portion 54 is for attachment of the electrode 50 to the weld gun arm 12, 14 that positions the electrode 52 at the weld location 20 for delivery of a controlled welding current through the workpiece stack-up 22. The welding electrode 50 may be constructed from a copper alloy of suitable electrical and thermal conductivity (e.g., a C15000 copper-zirconium alloy, a C18200 copper-chromium alloy (CuCr), or a C18150 copper-chromium-zirconium alloy) or some other appropriate material such as a dispersion strengthened copper material (e.g., copper with an aluminum oxide dispersion) or a tungsten-copper composite.

The weld face 56 of the welding electrode 50 is the portion of the electrode 50 that is pressed into contact with an outer surface of either an aluminum or steel workpiece to facilitate electrical current flow. A central axis 60 of the weld face 56 may be coaxially aligned with a central axis of the electrode body 52 (not shown) or, alternatively, the central axis 60 of the weld face 56 may be tilted with respect to the central axis of the electrode body 52 to better enable the weld gun to better access one or more of the weld location. In accordance with certain practices of present disclosure, the welding electrode 50 may have a multi-ring domed ("MRD") weld face design that is characterized by a convexly domed base weld face surface 62 and oxide-disrupting structural features 64 in the form of upstanding circular ridges 66. The convexly domed base weld face surface 62 has a diameter 621 that ranges from 6 mm to 22 mm, or more narrowly from 8 mm to 15 mm, at the base circumference of the domed base surface 62 (i.e., its widest dimension). Moreover, the convexly domed base weld face surface 62 may be a portion of a sphere having a radius of curvature that ranges from 15 mm to 300 mm, or more narrowly from 20 to 50 mm.

In this particular embodiment, the series of upstanding circular ridges 66 project outwardly from the base weld face surface 62. The number or upstanding circular ridges 66 present on the weld face 56 may range, for example, from two to ten, or more narrowly from three to five. Each of the upstanding circular ridges 66 is centered on and surrounds the central axis 60 of the weld face 56. When viewed from above in plan perspective, the several upstanding circular ridges 66 are radially spaced apart from each other by annular portions 68 of the base weld face surface 62 such that the upstanding ridges 66 become larger in diameter when moving from an innermost upstanding ridge 661 that immediately surrounds the central axis 60 of the weld face to an outermost upstanding ridge 663 that is farthest from the central axis 60 of the weld face 56 and, consequently, most proximate to the circumference of the base weld face surface 62 (FIG. 7).

The size and shape of the upstanding circular ridges 66 are subject to some variability without sacrificing their dressability. In one version, each of the upstanding circular ridges 66 has a closed circumference, meaning the ridge 66 is continuously curved when viewed from above in plan perspective such that its circumference is not interrupted. Additionally, the cross-sectional profile of each ridge 66 may lack that sharp corners and have a curved (as shown) or flat top surface. Moreover, each of the circular ridges 66 also has a ridge height 66h—taken at the highest point of the ridge—that extends upwards from the base weld face surface 62 when viewed in cross-section. The ridge height 66h of each ridge 66 preferably ranges from 20 μm to 400 μm or, more narrowly, from 50 μm to 300 μm. And the spacing of the ridges 66 as measured between the midpoints of two adjacent ridges 66 preferably ranges from 50 μm to 1800 μm or, more narrowly, from 80 μm to 1500 μm. Each of the upstanding circular ridges 66 is preferably semicircular, truncated semicircular, or truncated triangular in cross-section.

Figure 8:
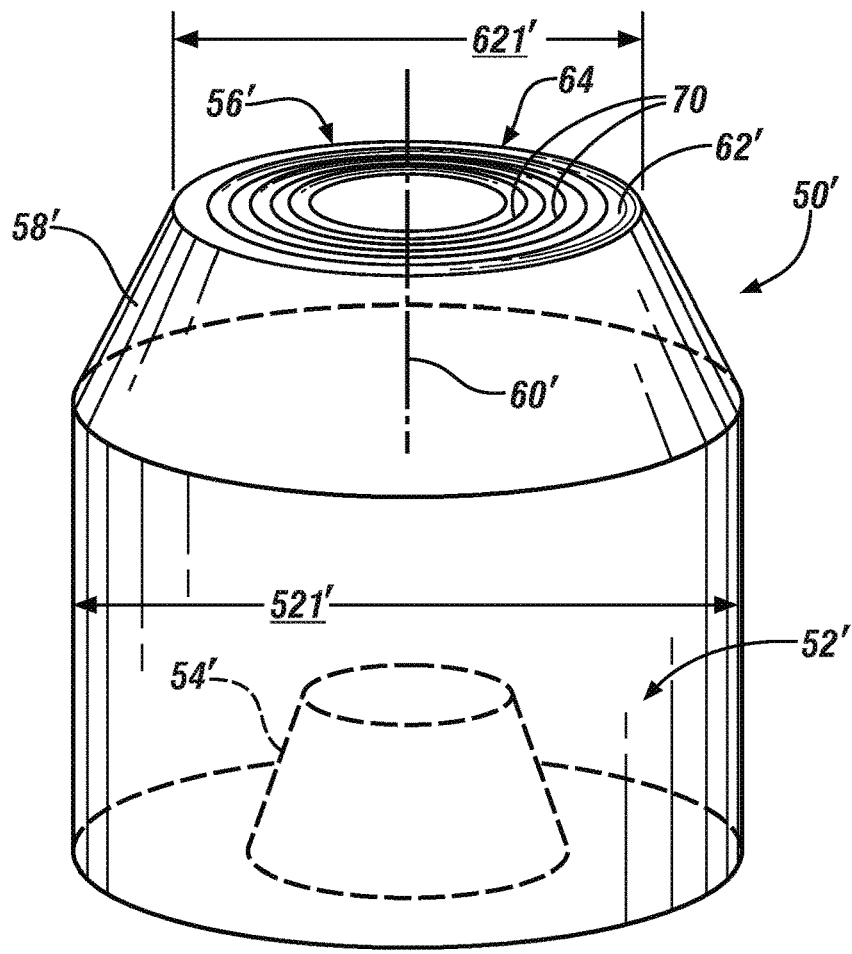
FIG. 8 is a perspective view of a welding electrode that embodies a particular weld face design (the grooved weld face design) and that represents the structure of each of the opposed welding electrodes carried by the weld gun shown in FIG. 2 according to another embodiment of the present disclosure.
Figure 9:
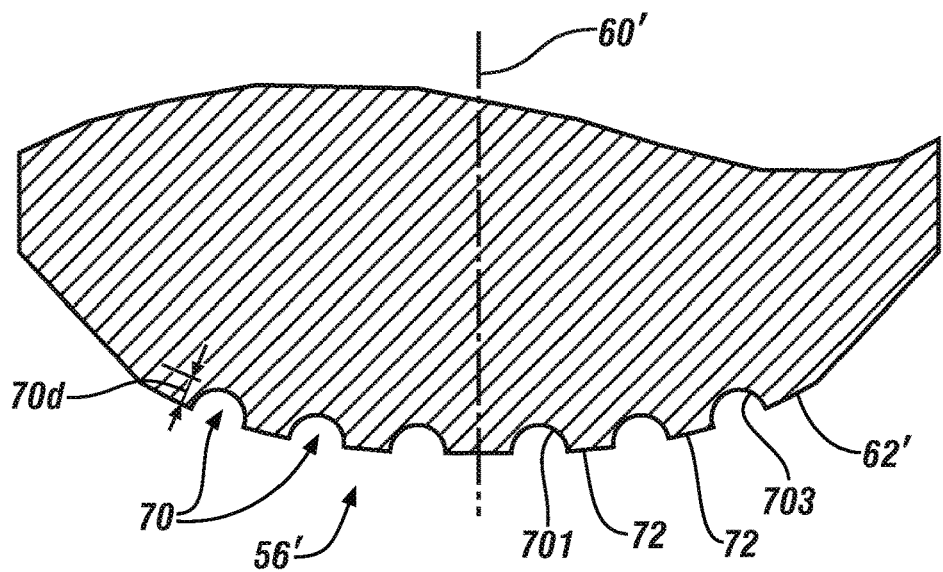
FIG. 9 is a magnified cross-sectional view of the weld face of the particular welding electrode illustrated in FIG. 8.

In accordance with other practices of present disclosure, an alternative construction of the welding electrode, which is identified by reference numeral 50' (which again is representative of each of the welding electrodes 16,18 in FIG. 2) may have a grooved weld face design as shown in FIGS. 8-9. The welding electrode 50' shown here is similar in many respects to the welding electrode 50 shown in FIGS. 6-7 except for the configuration of the oxide-disrupting features 64 on the convexly domed base weld face surface 62'. Specifically, in this embodiment, the oxide-disrupting features 64 are in the form of a series of recessed circular grooves 70. As such, like reference numerals are used in FIGS. 8-9 to indicate that the description of those features as set forth in the previous embodiment are equally applicable to this embodiment and, accordingly, a redundant discussion of those features is not provided. Only the primary difference relating to the oxide-disrupting features 64 is explained in further detail.

Referring now to FIGS. 8-9, the series of recessed circular grooves 70 intrude inwardly from the base weld face surface 62' and are centered about and surround the central axis 60' of the weld face 56'. When viewed from above in plan perspective, the several recessed circular grooves 70 are radially spaced apart from each other by annular portions 72 of the base weld face surface 62' such that the recessed grooves 70 become larger in diameter when moving from an innermost recessed groove 70₁ that immediately surrounds the central axis 60' of the weld face 56 to an outermost recessed groove 70₃ that is farthest from the central axis 60' of the weld face 56 and, consequently, most proximate to the circumference of the weld face 56' (FIG. 9).

Much like the upstanding ridges 66 illustrated in FIGS. 6-7, the size and shape of the recessed circular grooves 70 are subject to some variability without sacrificing their dressability. In one version, each of the recessed circular grooves 70 has a closed circumference, meaning the groove 70 is continuously curved when viewed from above in plan perspective such that its circumference is not interrupted. Additionally, the cross-sectional profile of each groove 70 may lack that sharp corners and have a curved (as shown) or flat bottom surface. Moreover, each of the circular grooves 70 also has a groove depth 70$d$—taken at the lowest point of the groove 70—that extends downwards from the base weld face surface 62' when viewed in cross-section. The groove depth 70$d$ of each groove 70 preferably ranges from 20 μm m to 400 μm or, more narrowly, from 50 μm to 300 μm. And the spacing of the grooves 70 as measured between the midpoints of two adjacent grooves 70 preferably ranges from 50 μm to 1800 μm or, more narrowly, from 80 μm to 1500 μm. Each of the recessed circular grooves 70 is preferably semicircular, truncated semicircular, or truncated triangular in cross-section.

Both the MRD weld face design and the grooved weld face design have been found to be quite effective in forming quality spot welds in workpiece stack-ups that include all aluminum workpieces, workpiece stack-ups that include all steel workpieces, and workpiece stack-ups that include an aluminum workpiece and an adjacent overlapping steel workpiece. In particular, the ridges/grooves 66, 70 that are present on the convexly domed base weld face surface 62, 62' enhance the mechanical, electrical, and thermal contact between the weld face 56, 56' and an aluminum workpiece since the ridges/grooves 66, 70 stretch and fracture any refractory oxide surface layers that may be present at the interface of the weld face 56, 56' and the aluminum workpiece. On the other hand, the convexly domed shape of the base weld face surface 62, 62' is the feature that enables the welding electrodes 50, 50' to concentrate current and heat within a steel workpiece. The ridges/grooves 66, 70 have no real impact when engaged with a steel workpiece and, in fact, are quickly plastically deformed. Accordingly, the presence of the upstanding circular ridges 66 or the recessed circular grooves 70, or any other oxide-disrupting structural features, generally does not help or interfere with current flow into and out of a steel workpiece.

The oxide-disrupting features 64 (upstanding circular ridges 66, recessed circular grooves 70, etc.) on the weld faces 56, 56' of the welding electrodes 50, 50' are susceptible to degradation. Several types of degradation are implicated here. When the weld face 50, 50' is brought into contact with an aluminum workpiece, a reaction can occur between the copper of the weld face and the aluminum of the workpiece that causes pitting of the weld face 50, 50'. When the weld face 50, 50' is brought into contact with a steel workpiece, plastic deformation of the oxide-disrupting features 64 may be accelerated, and overall mushrooming of the weld face 50, 50' may occur as well as contamination from iron, and, in the case of steel workpieces that include a surface layer comprising zinc, contaminates such as iron, zinc, and/or zinc oxide may accumulate on the weld face 50, 50'. One goal in the practice of the disclosed method is to be able to spot weld each of the various workpiece stack-ups that may be encountered when joining together the body-in-white 100 using the same weld gun 10 with the same set of opposed welding electrodes 16, 18 as aided by periodic restoration of the weld faces 24, 26 when needed. In this way, it is believed that each of the welding electrodes 16, 18 can participate in producing around a thousand or so spot welds before needing to be replaced.

The method of forming a sequence of spot welds in a variety of workpiece stack-ups 22 having different combinations of metal workpieces will now be described with reference to FIGS. 2-5. It will be appreciated that the un-joined fixtured assembly of component members that are to be joined into the body-in-white 100 is precisely assembled and the exact number and positions of each required spot weld is known including the types of workpieces (aluminum or steel) that will constitute the first and second metal workpieces 32, 34. This information is embodied in a suitable program which is utilized to direct the weld gun 10 for precise placement of its welding electrodes 16, 18 at each welding location 20 in a predetermined sequence. In accordance with the specified sequence, aluminum-to-aluminum spot welds, aluminum-to-steel spot welds, and the steel-to-steel spot welds may all be formed with the same welding electrodes. Anywhere from two to forty of each set of spot welds may typically be formed during a single progression through the welding sequence.

As used herein, the term "aluminum-to-aluminum" spot welds refers to welds formed in workpiece stack-ups in which all of the metal workpieces are aluminum workpieces, and the term "steel-to-steel" spot welds refers to welds formed in workpiece stack-ups in which all of the metal workpieces are steel workpieces. Each of the aluminum-to-aluminum spot welds and the steel-to-steel spot welds is thus a fusion weld nugget 74 (shown generically in FIG. 2) that fusion weld together two or more aluminum workpieces or two or more steel workpieces, respectively. The term "aluminum-to-steel" spot welds refers to welds formed in workpiece stack-ups that include an aluminum workpiece and an adjacent overlapping steel workpiece along with other optional aluminum workpieces and/or steel workpieces that may be disposed next to the pair of adjacent and overlapping aluminum and workpieces alongside the metal workpiece of the same base metal class; that is, any additional aluminum workpieces are disposed next to the aluminum workpiece that forms a faying interface with the steel workpiece and any additional steel workpieces are disposed next to the steel workpieces that forms a faying interface with the aluminum workpiece. Each of the aluminum-to-steel spot welds thus includes a weld joint 76 (FIGS. 4-5) formed within the aluminum workpiece that establishes a faying interface with the steel workpiece. This weld joint 76 is weld bonded or brazed to the adjacent faying surface of the steel workpiece and generally includes an aluminum weld nugget and an Fe—Al intermetallic layer separating the aluminum weld nugget and the steel workpiece.

To form each of the aluminum-to-aluminum spot welds, the aluminum-to-steel spot welds, and the steel-to-steel spot welds, the weld gun 10 is positioned relative to the workpiece stack-up 22 such that the weld face 24 of the first welding electrode 16 confronts the first side 28 of the stack-up 22 and the weld face 26 of the second welding electrode 18 confronts the second side 30 of the stack-up.

The first and second sides 28, 30 of the workpiece stack-up 22 may be provided by the exposed back surfaces 42, 44 of the first and second metal workpieces 32, 34, respectively, if the first and second metal workpieces 32, 34 are the only metal workpieces in the stack-up 22 (i.e., a "2T" stack-up). In other embodiments, however, and as explained above, the first side 28 and/or the second side 30 of the workpiece stack-up 22 may be provided by an additional third and/fourth metal workpiece that lies outside of an adjacent to the first and or second metal workpiece 32, 34 such as in the case of a "3T" or "4T" stack-up. Regardless of the number of workpieces involved, when forming an aluminum-to-aluminum spot weld, both the first and second sides 28, 30 of the workpiece stack-up 22 are aluminum workpiece surfaces. Likewise, when forming a steel-to-steel spot weld, both the first and second sides 28, 30 of the workpiece stack-up 22 are steel workpiece surfaces. And when forming an aluminum-to-steel spot weld, one of the first side 28 or the second side 30 of the workpiece stack-up 22 is an aluminum workpiece surface and the other of the first side 28 or the second side 30 of the workpiece stack-up 22 is a steel workpiece surface.

Once the weld gun is in place relative to the workpiece stack-up 22, the gun arms 12, 14 are operated to clamp the electrodes 16, 18 against the opposite first and second sides 28, 30 of the stack-up 22 at the welding location 20. In this way, the first weld face 24 is pressed against the first side 28 of the workpiece stack-up 22 and the second side weld face 26 is pressed against the second side 30 of the stack-up 22 so as to apply a clamping force that usually ranges from 600 lb (pounds force) to 1300 lb for aluminum-to-aluminum spot welds and aluminum-to-steel spot welds and from 400 lb to 1500 lb for steel-to-steel spot welds. An electrical current is then passed between the first and second weld faces 24, 26 and through the workpiece stack-up 22 at the welding location 20. Resistance to the flow of electrical current through the bulk workpiece material and across the faying interface(s) generates heat that creates a molten weld pool within at least one of the first or second metal workpieces 32, 34 depending on the spot weld being formed.

For aluminum-to-aluminum spot welds, an electrical current of between 15 kA and 60 kA may be passed in continuous or pulsed form between the first and second weld faces 24, 26 for a total duration of 40 ms to 400 ms. The passing electrical current flow generates heat and creates a molten aluminum weld pool that consumes the faying interface(s) established between each adjacent pair of aluminum workpieces at the weld location 20 within the stack-up 22. The molten aluminum weld pool extends through all or part of each of the aluminum workpieces and, upon terminating passage of the electrical current, solidifies into an aluminum weld nugget (represented by fusion weld nugget 74 in FIG. 2) that fusion welds the aluminum workpieces together. And while any suitable weld schedule may be employed to carry out formation of the aluminum-to-aluminum spot welds, a particularly preferred weld schedule is disclosed in U.S. Pat. Pub. No. 2013/0048613, the entire contents of which are incorporated herein by reference.

For aluminum-to-steel spot welds, an electrical current of between 10 kA and 40 kA may be passed in continuous or pulsed form between the first and second weld faces 24, 26 for a total duration of 40 ms to 4000 ms. The passing electrical current flow generates heat and creates a molten aluminum weld pool within the aluminum workpiece that lies adjacent to the steel workpiece. The molten aluminum weld pool wets the adjacent steel workpiece, which does not contribute molten material to the weld pool, and penetrates into aluminum workpiece, typically to a distance of 20% to 100% of its thickness, from a faying interface established between the aluminum and steel workpieces. Upon terminating passage of the electrical current, the molten aluminum weld pool solidifies into a weld joint 76 that weld bonds or brazes the aluminum and steel workpieces together. And while any suitable weld schedule may be employed to carry out formation of the aluminum-to-steel spot welds, a particularly preferred weld schedule is disclosed in U.S. application Ser. No. 14/883,249, the entire contents of which are incorporated herein by reference.

For steel-to-steel spot welds, an electrical current of between 3 kA and 25 kA may be passed in continuous or pulsed form between the first and second weld faces 24, 26 for a total duration of 10 ms to 2000 ms. The passing electrical current flow generates heat and creates a molten steel weld pool that consumes the faying interface(s) established between each adjacent pair of steel workpieces at the weld location 20 within the stack-up 22. The molten steel weld pool extends through all or part of each of the steel workpieces and, upon terminating passage of the electrical current, solidifies into a steel weld nugget (represented by fusion weld nugget 74 in FIG. 2) that fusion welds the steel workpieces together. Any suitable weld schedule may be employed to carry out formation of the steel-to-steel spot welds.

Because of the degradation mechanisms that affect the oxide-disrupting features 64 on the weld faces 24, 26 of the welding electrodes 16, 18, the overall spot welding sequence would generally progress in the following order if the cover described in more detail below is not used: a set of the aluminum-to-aluminum spot welds are completed first, then a set of the aluminum-to-steel spot welds are completed, and finally a set of the steel-to-steel spot welds are completed last. This sequence ensures that the oxide-disrupting features 64 are preserved as long as possible in order to contribute to the formation of aluminum-to-aluminum spot welds and aluminum-to-steel spot welds before being plastically deformed and possibly contaminated with iron, zinc, and/or zinc oxide during formation of the steel-to-steel welds. Each of the weld faces 24, 26 might then be restored after the set of steel-to-steel spot welds is completed to make sure the weld faces 24, 26 are freshly restored for the upcoming sets of upcoming aluminum-to-aluminum and aluminum-to-steel spot welds, restoration may not be necessary at this time depending on the extent of degradation of the weld faces 24, 26. Each of the set of aluminum-to-aluminum spot welds, the set of aluminum-to-steel spot welds, and the set of steel-to-steel spot welds may include anywhere from two to forty of its spot welds.

The performance, planning, and sequencing of the various above-described spot welds may benefit from the use of a cover 78 during formation of the aluminum-to-steel spot welds in a number of ways. In use, the cover 78 is positioned to protect and isolate the first weld face 24 from the first side 28 of the workpiece stack-up 22 or is positioned to protect and isolate the second weld face 26 from the second side 30 of the workpiece stack-up 22, but not both, at least during current flow between the first and second welding electrodes 16, 18. The cover 78 may assume a variety of constructions depending on whether it will be used in conjunction with an aluminum workpiece surface or a steel workpiece surface. When the cover 78 is intended to be used in conjunction with an aluminum workpiece surface, the cover 78 may be a planar cover plate or a cover tape as described, for instance, in US 2015/0096961, the entire contents of which are incorporated herein by reference. When the cover 78 is intended to be used in conjunction with a steel workpiece surface, the cover 78 may be a cover plate having a planar base and an outwardly extending dome portion. These constructions of the cover 78 are shown in FIGS. 3-5 and are described in more detail below.

Figure 3:
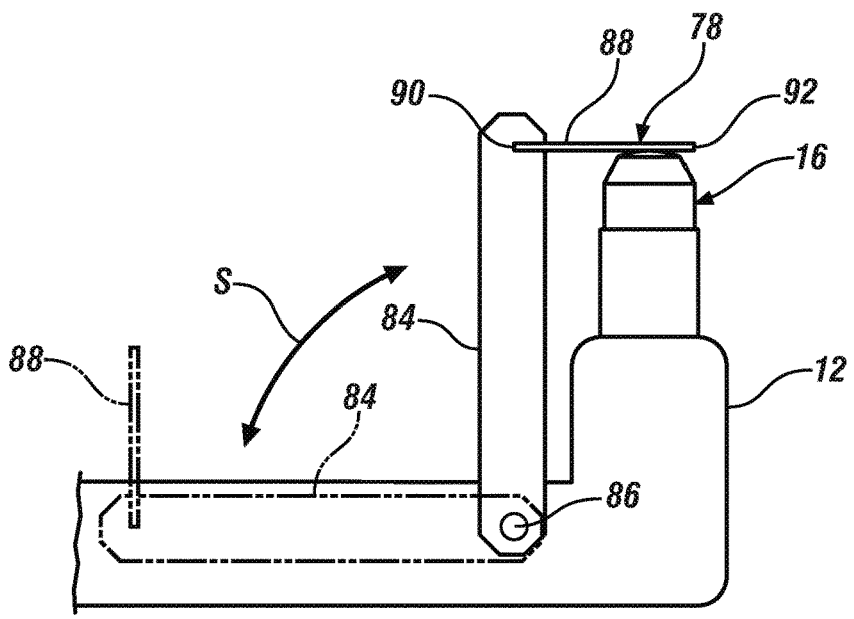
FIG. 3 is a side view of an embodiment of a weld gun arm that is carrying a welding electrode and a cover and is configured to insert the cover between the welding electrode and a side of a workpiece stack-up that includes an aluminum workpiece and an adjacent steel workpiece by way of a rotating arm.
Figure 4:
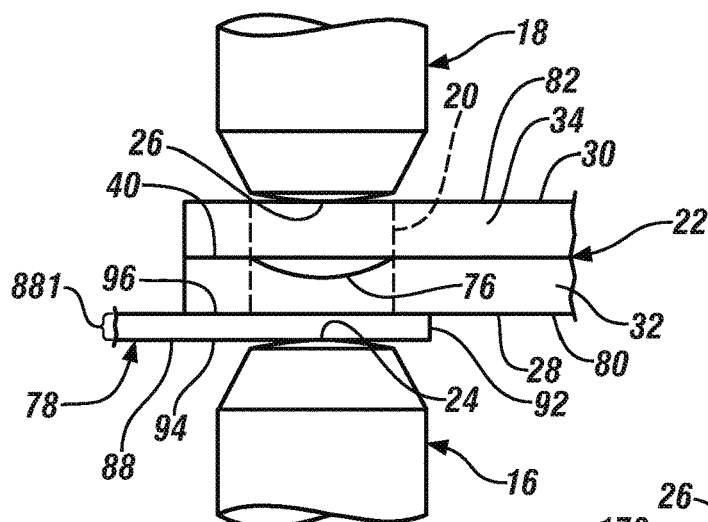
FIG. 4 is an enlarged schematic side view of the use and positioning of the cover depicted in FIG. 3 according to one embodiment of the present disclosure.
Figure 5:
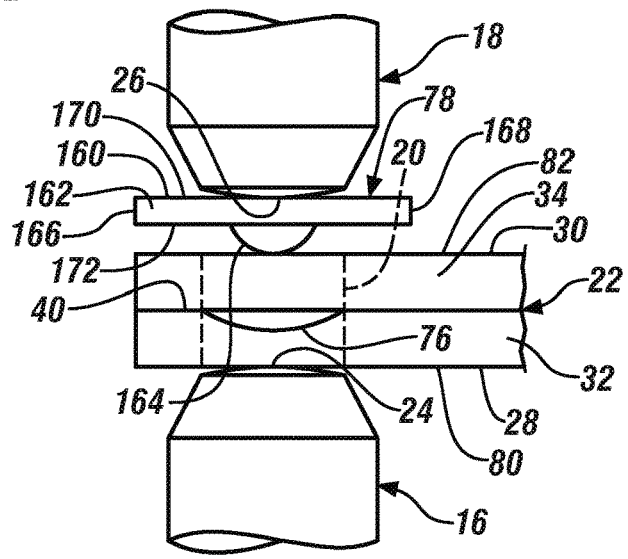
FIG. 5 illustrates the use of a cover that includes an outwardly extending dome portion according to one embodiment of the present disclosure.

Referring now to FIGS. 3-4, the cover 78 is shown inserted between the weld face 24 of the first welding electrode 16 and an aluminum workpiece surface 80 that provides the first side 28 of the workpiece stack-up 22, although the cover 78 could just as easily be constructed for insertion between the weld face 26 of the second welding electrode 18 and an aluminum workpiece surface that provides the second side 30 of the stack-up 22. The idea here is to be able to selectively protect and isolate one of the weld faces 24, 26 of the welding electrodes 16, 18 with the cover 78 to enable a robust spot welding practice that allows for flexibility in the order in which the aluminum-to-aluminum spot welds, the aluminum-to-steel spot welds, and the steel-to-steel spot welds are formed. The concept of protecting the weld face 24, 26 of one of the welding electrodes 16, 18 with the cover 78 will be explained below in the context of protecting the first weld face 24 of the first welding electrode 16. It should be appreciated, however, that the second weld face 26 of the second welding electrode 18 could just as easily be designated for protection by the cover 78 in accordance with the same teachings and principals.

When forming aluminum-to-steel spot welds, the aluminum workpiece surface 80 shown in FIG. 3 may be presented to the weld face 24 of the first welding electrode 16 in various circumstances such as when the exposed back surface 42 of the first metal workpiece 32 which, here, is an aluminum workpiece that forms a faying interface with the second metal workpiece 34, which is a steel workpiece, provides the first side 28 of the stack-up 22 or when an additional aluminum workpiece (not shown) lies adjacent to the first metal (aluminum) workpiece 32. The interjection of the cover 78 between the first weld face 24 and the aluminum workpiece surface 80 can cause one or both of a reduction in current density through the first metal (aluminum) workpiece 32 and the generation of heat on the first side 28 of the workpiece stack-up 22 that ordinarily would not be produced due to the fact that the first welding electrode 16 is often aggressively cooled with water. In some instances, for example, the cover 78 may be made of a metal having a greater electrical resistivity than that of the first welding electrode 16 and the first metal (aluminum) workpiece 32, which causes the cover 78 itself to generate heat during current flow between the welding electrodes 16, 18. In other instances, the cover 78 may be made of a metal having the same or a lower electrical resistivity than the first metal (aluminum) workpiece 32, which will cause a reduction in current density through the first metal (aluminum) workpiece 32 without generating additional heat within the bulk material of the cover 78.

The change in current density and/or the additional heat input attributed to the cover 78—which is introduced into the first metal (aluminum) workpiece 32 at the weld location 20 in addition to, and from the opposite direction of, the heat developed in the second metal (steel) workpiece 34—affects the solidification behavior of the molten aluminum weld pool as it cools and solidifies into a weld joint 76. By reducing the current density through the first metal (aluminum) workpiece 32, it is believed that the solidification of the molten aluminum weld pool progresses from its outer perimeter towards its center, as opposed directionally towards the second metal (steel) workpiece 34, which functions to sweep and consolidate weld defects towards the center of the weld joint 76. Locating weld defects in this region of the weld joint 76 can improve the peel strength and the cross-tension strength of the weld joint 76 be keeping weld defects away from the periphery of the solidified weld joint 76. Additionally, if the cover 78 generates heat, the thickness of the hard and brittle Fe—Al intermetallic layer(s) that may form along the faying surface 38 of the second metal (steel) workpiece 34 can be minimized.

The cover 78 can be selectively inserted between the weld face 24 of the first welding electrode 16 and the aluminum workpiece surface 80 that provides the first side 28 of the workpiece stack-up 22 during the formation of aluminum-to-steel spot welds, and can also be removed and withdrawn, by way of several different mechanisms. In some cases, the exact insertion and removal mechanism may depend upon the design and construction of the first weld gun arm 12 or of the larger weld gun 10. In the embodiment illustrated in FIGS. 3-4, for example, the insertion and removal functionality is carried out by an arm 84 connected and mechanically coupled to the first gun arm 12. Here, the arm 84 is pivotally connected to the first gun arm 12 at a location spaced from the first welding electrode 16. The arm 84 rotates about a pivot axle 86 and axis along a swing path S between its inserted position and state (shown in solid lines in FIG. 3) in which the cover 78 is placed between the weld face 24 of the first welding electrode 16 and the aluminum workpiece surface 80 that provides the first side 28 of the workpiece stack-up 22, and its removed position and state (shown in broken lines in FIG. 3) in which the cover 78 is retracted from between weld face 24 of the first welding electrode 16 and the first side 28 of the workpiece stack-up 22.

The pivot axle 86 can be mounted and journaled directly to the first weld gun arm 12, as shown, or it can be mounted and journaled to a pair of brackets that themselves are attached to the first weld gun arm 12. Of course, other mountings are possible that provide rotation and swinging about the pivot axis, despite not being expressly shown and described here. Furthermore, movement between the inserted and removed positions can be automated by a motor, such as a servo rotary actuator or a pneumatically powered actuator, or the movement can be manually controlled. In the case of automation, the movement can be regulated by a controller that is electrically coupled to the motor and programmed to insert the cover 78 between the weld face 24 of the first welding electrode 16 and the aluminum workpiece surface 80 that provides the first side 28 of the workpiece stack-up 22 at the weld location 20, and to later remove the cover 78 when its functionality is not needed.

In the embodiment of FIGS. 3-4, the cover 78 is provided in the form of a cover plate 88. The cover plate 88 can be releasably attached to the arm 84 by different attachment techniques. Ideally though, the attachment is robust enough to endure the automated welding operation that is typical in automotive applications. Here, the cover plate 88 has a generally rectangular shape, has a first end 90 releasably attached to the arm 84 and a second free end 92 suspended away from the attachment, and has a first outer surface 94 that confronts the weld face 24 of the first welding electrode 16 and a second outer surface 96 that confronts the aluminum workpiece surface 80 that provides the first side 28 of the workpiece stack-up 22 (FIG. 4). Between its ends 90, 92, the cover plate 88 has a longitudinal length sufficient to span the full extent of the first weld face 24 so that the first weld face 24 engages and presses against the cover plate 88 and not the aluminum workpiece surface 80 of the workpiece stack-up 22 when inserted and in use. Likewise, the cover plate 88 has a lateral width transverse to its longitudinal length sufficient to span the full extent of the first weld face 24 when the cover plate 88 is inserted between the first weld face 24 and the aluminum workpiece surface 80 that provides the first side 28 of the workpiece stack-up 22 at the weld location 22. Here, as shown, the second outer surface 96 of the cover plate 88 makes contact with a greater surface area of the aluminum workpiece surface 80 than the first outer surface 94 makes with the first weld face 24, which, consequently, not only acts to reduce the current density through the first metal (aluminum) workpiece 32 during current flow, but also isolates the first weld face 24 from the aluminum workpiece surface 80.

The cover plate 88 can be constructed of a variety of materials that render it more electrically resistive than the first welding electrode 16 and the first metal (aluminum) workpiece 32. In one specific example, the cover plate 88 is made of a low carbon steel and has a thickness 881 (FIG. 4) that ranges between 0.1 mm and 0.4 mm. This example of the cover plate 88 might be used for a relatively limited number of aluminum-to-steel spot welds, such as up to ten, and could then be replaced with another yet-to-be-used cover plate 88. In another specific example, the cover plate 88 may be made of molybdenum or a molybdenum-based alloy, niobium or a niobium-based alloy, tungsten or a tungsten-based alloy, or a refractory metal composite such as a tungsten-copper composite, and its thickness 881 may range between 0.5 mm and 10.0 mm. This example of the cover plate 88 is more durable than the previous example—based on thickness and material choice—and could thus be used for a relatively higher number of aluminum-to-steel spot welds, such as one-thousand or more. In this example, a periodic cleaning operation may be desirable to remove contamination from the cover plate 88 after a set number of aluminum-to-steel spot welds is performed—e.g., ten to one-hundred welds—in order to extend the useful life of the cover plate 88. The contamination could result from the accumulation of melted aluminum on the second outer surface 96 of the cover plate 88. The cleaning operation could be carried out with rotating wire wheels, brushes, or other abrasive media.

As mentioned above, the cover plate 88 may also be constructed from a variety of material that render it less electrically resistive than the first metal (aluminum) workpiece 32 yet, preferably, still more electrically resistive than the first welding electrode 16. In those situations, the cover plate 88 may be constructed from a copper alloy such as, for example, a Cu—Ni—Cr—Si alloy typically designated C18000, which has an electrical conductivity of about 45% IACS (The electrical conductivity associated with IACS or 100% IACS being the electrical conductivity of commercially pure, annealed copper at 20° C., which is defined as $5.80 \times 10^7$ S/m). A cover plate 88 formed of such copper alloys can be effective at reducing the current density of the electrical current within the first metal (aluminum) workpiece 32. The thickness 881 of the cover plate 88, if made from a copper alloy, may range from 0.5 mm to 10.0 mm, making it durable and able to participate in the formation of multiple aluminum-to-steel spot welds, especially when subjected to periodic cleaning to remove contamination.

While the cover 78 in FIG. 3 protects the first weld face 24 of the first welding electrode 16 (or the second weld face 26 of the second welding electrode 18), the opposite second welding electrode 18 is "unprotected" (or the opposite first welding electrode 16 is unprotected if the second welding electrode 18 is the protected one). By protecting one of the welding electrodes 24, 26 via insertion of the cover 78 when an aluminum workpiece surface is presented, the order in which aluminum-to-aluminum, aluminum-to-steel, and steel-to-steel spot welds are formed is more flexible since the protected welding electrode can still be used to exchange current through an aluminum workpiece surface, albeit in a protected state, even after it has been degraded to the point that it would not otherwise be used directly against an aluminum workpiece surface without first being restored. For example, in one implementation, it may still be desired to follow an overall spot welding sequence that calls for (1) a set of the aluminum-to-aluminum spot welds to be completed first, then (2) a set of the aluminum-to-steel spot welds to be completed, and finally (3) a set of the steel-to-steel spot welds to be completed last. In following this sequence, the cover 78 in the form of the cover plate 88, for example, may be inserted between the weld face 24, 26 of the protected welding electrode 16, 18 during formation of the aluminum-to-steel spot welds anytime the weld face 24, 26 of the protected welding electrode 16, 18 confronts an aluminum workpiece surface 80. By inserting the cover 78, the structure and integrity of the weld joint 76 that bonds the aluminum and steel workpieces together is improved as evident from increases peel and cross-tension strength. Each of the set of aluminum-to-aluminum spot welds, the set of aluminum-to-steel spot welds, and the set of steel-to-steel spot welds may include anywhere from two to forty of its spot welds.

After forming the steel-to-steel spot welds, however, each of the first and second weld faces 24, 26 is likely to be degraded to some extent by deformation of the oxide-disrupting features 64 or mushrooming of the weld face 24, 26 as well as contamination with iron and possibly zinc and/or zinc oxide. In the absence of the cover 78, and before using the same welding electrodes 24, 26 to start the sequence over and form new aluminum-to-aluminum spot welds or aluminum-to-steel spot welds, the weld faces 24, 26 along with their oxide-disrupting features 64 may have to be restored by a rotating cutting tool having one or more cutting flutes configured to recreate the convexly domed base weld face surface 62, 62' of the weld faces 24, 26 and to recut fresh oxide-disrupting features 64 back onto the weld face 24, 26. The cover 78 enables a more flexible approach. In particular, after the steel-to-steel spot welds are formed, the welding electrodes 16, 18 could be used to form another set of aluminum-to-steel spot welds if the weld face 24, 26 of the protected welding electrode 16, 18 confronts the aluminum workpiece surface 80 on the first side 28 of the stack-up 22 when the stack-up 22 is positioned between the electrodes 24, 26. In this way, and in the context of FIG. 3, the cover 78 could be inserted between the first weld face 24 of the protected first welding electrode 16 to isolate the degraded first weld face 24 from the aluminum workpiece surface 80 that provides the first side 28 of the stack-up 22 while aiding in the formation of the weld joint 76. The weld face 26 of the unprotected second welding electrode 18 is generally not a concern since it is merely continuing to be pressed against a steel workpiece surface.

The ability to protect a degraded weld face allows for other spot welding sequences to be carried out as well. For instance, in another implementation, the aluminum-to-aluminum spot welds may be formed first followed by the steel-to-steel spot welds. As before, each of the first and second weld faces 24, 26 would suffer some degradation (e.g., deformation of the oxide-disrupting features 64 or mushrooming of the weld face 24, 26 as contamination with iron and possibly zinc and/or zinc oxide) as a consequence of forming the steel-to-steel welds. But, by using the cover 78, any aluminum-to-steel spot welds can still be formed if the first weld face 24 of protected first welding electrode 16 (in the context of FIG. 3) confronts the aluminum workpiece surface 80 on the first side 28 of the stack-up when the stack-up 22 is positioned between the electrodes 24, 26. In that regard, as before, the cover 78 could be inserted between the first weld face 24 of the protected first welding electrode 16 to isolate the degraded first weld face 24 from the aluminum workpiece surface 80 that provides the first side 28 of the stack-up 22 while aiding in the formation of the weld joint 76. The weld face 26 of the unprotected second welding electrode 18 is generally not a concern since it is merely continuing to be pressed against a steel workpiece surface.

The availability of the cover 78 in FIG. 3 thus enables the weld face 24 of the protected first welding electrode 24 to continue to participate in forming aluminum-to-steel spot welds even after that weld face 24 has been degraded by contact with aluminum and/or steel workpieces so long as the cover 78 is inserted between the first weld face 24 and the aluminum workpiece surface 80 on the first side 28 of the workpiece stack-up 22. The weld face 26 of the unprotected second welding electrode 18 must generally complete all of the spot welds where contact with an aluminum workpiece surface is required before moving onto any of the spot welds where contact with a steel workpiece surface is required. This is because the steel workpiece surface will generally, but not necessarily always, plastically deform the oxide-disrupting surface features 64 originally present on the second weld face 26, cause overall mushrooming of the second weld face 26, and contaminate the second weld face 26 with iron and possibly zinc and/or zinc oxide to thereby compromise the ability of the second weld face 26 to subsequently exchange electrical current with an aluminum workpiece surface. No such issues exist if the second weld face 26 continues to be pressed against steel workpiece surfaces so long as the second weld face 26 does not become so degraded over time that overheating at the interface of the second weld face 26 and a steel workpiece surface results in surface expulsion.

Referring now to the embodiment shown in FIG. 5, and according to another practice of the present disclosure, the cover 78 is shown inserted between the weld face 26 of the second welding electrode 18 and a steel workpiece surface 82 that provides the second side 30 of the workpiece stack-up 22, although the cover 78 could just as easily be constructed for insertion between the weld face 26 of the first welding electrode 16 and steel workpiece surface that provides the first side 28 of the stack-up 22. An alternative use of the cover 78 involves selectively inserting the cover 78 between the weld face 26 of the second welding electrode 18 and a steel surface 82 that provides the second side 20 of the workpiece stack-up 22 during the formation of aluminum-to-steel spot welds. The concept of protecting one of the welding electrodes according to this embodiment will be explained below in the context of protecting the second weld face 26 of the second welding electrode 18. It should be appreciated, however, that the first weld face 24 of the first welding electrode 16 could just as easily be designated for protection by the cover 78 in accordance with the same teachings and principals.

When forming aluminum-to-steel spot welds, the steel workpiece surface 82 shown in FIG. 4 may be presented to the weld face 26 of the second welding electrode 18 in various circumstances such as when the exposed back surface 44 of the second metal workpiece 34 which, here, is a steel workpiece that forms a faying interface with the first metal workpiece 32, which is an aluminum workpiece, provides the second side 30 of the stack-up 22 or when an additional steel workpiece (not shown) lies adjacent to the second metal (steel) workpiece 34. The interjection of the cover 78 between the second weld face 26 and the steel workpiece surface 82 can modify the flow of current through the workpiece stack-up 22 in a way that helps produce a weld joint 76 with good strength, as will be described in more detail below. The material of the cover plate 160 is preferably a copper material such as a copper-zirconium alloy (e.g., C15000), a copper-chromium alloy (e.g., C18200), or a copper-chromium-zirconium alloy (e.g., C18150), a dispersion strengthened copper (e.g., copper with an aluminum oxide dispersion), or a tungsten-copper composite.

The cover 78 can be selectively inserted into position between the second weld face 26 of the second welding electrode 18 and the steel workpiece surface 82 that provides the second side 30 of the workpiece stack-up 22, and can also be removed and withdrawn from an inserted position to a removed position, by the same mechanism described above in connection with FIG. 3, although here the cover 78 may assume a different configuration. Indeed, as shown, the cover 78 of this embodiment may be a cover plate 160 having a planar base 162 and an outwardly extending dome portion 164. The planar base 162 has a generally rectangular shape with a first end 166 releasably attached to the arm 84 (as in FIG. 3) and a second free end 168, and as a first outer surface 170 that confronts the weld face 26 of the second welding electrode 18 and a second outer surface 172 that confronts the steel workpiece surface 82 that provides the second side 30 of the workpiece stack-up 22 and surrounds the extending dome portion 164. Between its ends 166, 168, the planar base 162 has a longitudinal length sufficient to span the full extent of the second weld face 26 so that the second weld face 26 engages and presses against the planar base 162 and not the steel workpiece surface 82 that provides second side 30 of the workpiece stack-up 22 when inserted and in use. Likewise, the planar base 162 has a lateral width transverse to its longitudinal length sufficient to span the full extent of the second weld face 26 when the cover plate 160 is inserted between the second weld face 26 and the second side 30 of the workpiece stack-up 22 at the weld location 22.

The extending dome portion 164 in convex in shape and has a diameter less than the diameter (i.e., numeral 621 in FIG. 6) of the second weld face 26. For example, the extending dome portion 164 may have a diameter at the second outer surface 172 that ranges from 3 mm to 22 mm, or more narrowly from 6 mm to 10 mm. The extending dome portion may also have a spherical shape with a radius of curvature that ranges from 4 mm to 12 mm, or more narrowly from 6 mm to 10 mm, as an example of a dome shape. Optionally, a round, central contacting spot that is flat or has a radius of curvature between 15 mm and 300 mm may be located on the top of the extending dome portion. When the cover plate 160 is in use, the weld face 26 of the second welding electrode 18 is pressed against the first outer surface 170 of the planar base 162, and the extending dome portion 164 is pressed against the steel workpiece surface 82 that provides the second side 30 of the workpiece stack-up 22. In this way, the extending dome portion 164 can concentrate current flow into the second metal (steel) workpiece 34, thus creating a conical current flow pattern that helps drive and consolidate weld defect in a central region of the weld joint 76 as disclosed in US 2016/0288242, the entire contents of which are incorporated herein by reference, while also isolating the weld face 26 of the second welding electrode 18 from degradation that may be occur from direct contact with the steel workpiece surface 82 at the second side 30 of the stack-up 22. Such degradation may be in the form of plastic deformation of the oxide-disrupting structural features 64, mushrooming of the weld face 26, and contamination from iron and possibly zinc and/or zinc oxide.

While the cover 78 in FIG. 4 protects the second weld face 26 of the second welding electrode 18 (or the first weld face 24 of the first welding electrode 16), the opposite first welding electrode 16 is "unprotected" (or the opposite second welding electrode 18 is unprotected if the first welding electrode 16 is the protected one). By protecting one of the welding electrodes 24, 26 via insertion of the cover 78 when a steel workpiece surface is presented, the order in which aluminum-to-aluminum, aluminum-to-steel, and steel-to-steel spot welds are formed is more flexible since the protected welding electrode can be used to exchange current through a steel workpiece surface, albeit in a protected state, without experiencing the accelerated degradation that it otherwise would if pressed directly against the steel workpiece surface, especially if the steel workpiece surface is coated with zinc. For example, in one implementation, it may still be desired to follow an overall spot welding sequence that calls for (1) a set of the aluminum-to-aluminum spot welds to be completed first, then (2) a set of the aluminum-to-steel spot welds to be completed, and finally (3) a set of the steel-to-steel spot welds to be completed last. In following this sequence, the cover 78 in the form of the cover plate 160, for example, may be inserted between the weld face 24, 26 of the protected welding electrode 16, 18 during formation of the aluminum-to-steel spot welds anytime the weld face 24, 26 of the protected welding electrode 16, 18 confronts a steel workpiece surface 82. By inserting the cover 78, the weld joint 76 that bonds the aluminum and steel workpieces together is formed with good strength properties, as evident from increases in peel and cross-tension strength, while preserving the oxide-disrupting structural features 64 on the weld face 24, 26 since the weld face 24, 26 is isolated from the steel workpiece surface 82. Each of the set of aluminum-to-aluminum spot welds, the set of aluminum-to-steel spot welds, and the set of steel-to-steel spot welds may include anywhere from two to forty of its spot welds, as before.

After forming the steel-to-steel spot welds, however, each of the first and second weld faces 24, 26 is likely to be degraded to some extent. Before using the same welding electrodes 24, 26 to start the sequence over and form new aluminum-to-aluminum spot welds or aluminum-to-steel spot welds, the weld faces 24, 26 along with their oxide-disrupting features 64 may have to be restored by a rotating cutting tool having one or more cutting flutes configured to recreate the convexly domed base weld face surface 62, 62' of the weld faces 24, 26 and to recut fresh oxide-disrupting features 64 back onto the weld face 24, 26. The use of the cover 78 during the formation of the aluminum-to-steel spot welds does not provide much additional flexibility in terms of forming any aluminum-to-aluminum spot welds or aluminum-to-steel spot welds after forming the steel-to-steel spot welds unless of course the number of aluminum-to-steel and steel-to-steel spot welds previously formed are so few that the first and second weld faces 24, 26 do not undergo much degradation and their oxide-disrupting structural features 64 are still relatively intact.

The ability to protect the second weld face 26 (in the context of FIG. 4) provides some process flexibility in that other spot welding sequences besides the one just mentioned can be carried out as well. For instance, in another implementation, the aluminum-to-steel spot welds may be formed first using the cover 78. To be sure, during formation of the aluminum-to-steel spot welds, the cover 78 is inserted between the second weld face 26 of the second welding electrode 18 and the steel workpiece surface 82 that provides the second side 30 of the workpiece stack-22. This protects the second weld face 26 and helps preserve its oxide-disrupting features 64 and prevent contamination since the cover 78 isolates the second weld face 26 from the steel workpiece surface 82. The aluminum-to-aluminum spot welds may then be formed since the oxide-disrupting structural features 64 of the first and second weld faces 24, 26 are still relatively intact. At this point, aluminum-to-steel spot welds may be formed again if the second weld face 26 of the protected second welding electrode 18 confronts the steel workpiece surface 82 on the second side 30 of the workpiece stack-up 22 when the stack-up 22 is positioned between the electrodes 24, 26. The weld face 24 of the unprotected first welding electrode 16 is generally not a concern during the formation of all the spot welds since it is merely being pressed against an aluminum workpiece surface during all of the aluminum-to-steel spot welds and aluminum-to-aluminum spot welds. The steel-to-steel spot welds may then be formed at which point both of the first and second weld faces 24, 26 would likely experience enough degradation that restoration of the weld faces 24, 26 would be needed to recreate the convexly domed base weld face surface 62, 62' of the weld faces 24, 26 and to recut fresh oxide-disrupting features 64 back onto the weld face 24, 26.

The availability of the cover 78 in FIG. 4 thus enables the weld face 26 of the protected second welding electrode 26 to continue to participate in forming aluminum-to-aluminum spot welds even after that weld face 26 exchanges current with the steel workpiece surface 82 through the cover 78 since, under those circumstances, its oxide-disrupting structural features 64 do not experience the type of accelerated degradation (e.g., deformation of the oxide-disrupting features 64 or mushrooming of the weld face 24, 26 as well as possible contamination with iron and possibly zinc and/or zinc oxide) that would occur if the second weld face 26 is pressed directly against the steel workpiece surface 82. The weld face 24 of the unprotected first welding electrode 16 must generally complete all of the spot welds where contact with an aluminum workpiece surface is required before moving onto any of the spot welds where contact with a steel workpiece surface is required. This is because the steel workpiece surface will generally, but not necessarily always, plastically deform the oxide-disrupting surface features 64 originally present on the first weld face 24 thereby compromising the ability of the weld face 24 to subsequently exchange electrical current with an aluminum workpiece surface.

The above description of preferred exemplary embodiments is merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding workpiece stack-ups of different combinations of metal workpieces with a single weld gun using the same set of welding electrodes, the method comprising:

providing a weld gun that carries a first welding electrode having a first weld face and an opposed second welding electrode having a second weld face, each of the first weld face and the second weld face comprising oxide disrupting structural features, wherein the oxide-disrupting structural features on each of the first and second weld faces comprises a series of upstanding circular ridges or a series or recessed circular grooves;

assembling a fixtured assembly that includes aluminum workpieces and steel workpieces arranged to provide one or more workpiece stack-ups that include only overlapping aluminum workpieces, one or more workpiece stack-ups that include an aluminum workpiece and an overlapping adjacent steel workpiece, and one or more workpiece stack-ups that include only overlapping steel workpieces;

forming a set of aluminum-to-aluminum spot welds in the one or more workpiece stack ups that include only overlapping aluminum workpieces with the first and second welding electrodes, each of the aluminum-to-aluminum spot welds comprising an aluminum nugget that fusion welds the aluminum workpieces together;

forming a set of aluminum-to-steel spot welds in the one or more workpiece stack-ups that include an aluminum workpiece and an adjacent overlapping steel workpiece with the first and second welding electrodes, each of the aluminum-to-steel spot welds comprising a weld joint contained within an aluminum workpiece that weld bonds the aluminum workpiece to an adjacent steel workpiece, and wherein forming at least one of the set of aluminum-to-steel spot welds in a workpiece stack-up that includes an aluminum workpiece and an overlapping adjacent steel workpiece, and further has an aluminum workpiece surface at a first side of the workpiece stack-up and a steel workpiece surface at a second side of the workpiece stack up, comprises pressing the first weld face of the first welding electrode against the aluminum workpiece surface at the first side of the workpiece stack-up and pressing the second weld face of the second welding electrode against a cover that is inserted between the second weld face and the steel workpiece surface at the second side of the workpiece stack-up to isolate the second weld face from the second side of the workpiece stack-up during current flow, wherein the cover is a cover plate that includes a planar base and an outwardly extending dome portion having a convex shape, the second weld face of the second welding electrode being pressed against the planar base and the outwardly extending dome portion being pressed against the steel workpiece surface at the second side of the workpiece stack-up; and forming a set of steel-to-steel spot welds in the one or more workpiece stack-ups that include only overlapping steel workpieces with the first and second welding electrodes, each of the steel-to-steel spot welds comprising a steel nugget that fusion welds the steel workpieces together;

wherein the set of aluminum-to-aluminum spot welds is formed first, the set of aluminum to-steel spot welds is formed after the set of aluminum-to-aluminum spot welds, and the set of steel-to-steel spot welds is formed after the set of aluminum-to-steel spot welds.

2. The method set forth in claim 1, wherein the oxide disrupting structural features on the first weld face, the second weld face, or both the first and second weld faces comprises a series of upstanding circular ridges that are centered about and surround a central axis of the weld face and which project outwardly from a base weld face surface of the weld face, the series of upstanding circular ridges including anywhere from two circular ridges to ten circular ridges starting from an innermost ridge that immediately surrounds the central axis of the weld face and ending with an outermost ridge that is farthest from the central axis of the weld face.

3. The method set forth in claim 1, wherein the oxide disrupting structural features on the first weld face, the second weld face, or both the first and second weld faces comprises a series of recessed circular grooves that are centered about and surround a central axis of the weld face and which intrude inwardly into a base weld face surface of the weld face, the series in recessed grooves including anywhere from two circular grooves to ten circular grooves starting from an innermost groove that immediately surrounds the central axis of the weld face and ending with an outermost groove that is farthest from the central axis of the weld face.

4. The method set forth in claim 1, wherein the cover plate is constructed from a dispersion strengthened copper alloy.

5. The method set forth in claim 1, wherein the cover plate is constructed from a tungsten-copper composite.

6. The method set forth in claim 1, wherein each of the one or more workpiece stack-ups that include an aluminum workpiece and an overlapping adjacent steel workpiece has an aluminum workpiece surface at a first side of the workpiece stack-up and a steel workpiece surface at a second side of the workpiece stack-up, and, wherein, during formation of each of the set of aluminum-to-steel spot welds, the cover is inserted between the second weld face of the second welding electrode and the steel workpiece surface at the second side of each of the one or more workpiece stack-ups that include an aluminum workpiece and an overlapping adjacent steel workpiece to isolate the second weld face from the steel workpiece surface of each of the one or more workpiece stack-ups that include an aluminum workpiece and an overlapping adjacent steel workpiece.

7. The method set forth in claim 1, wherein the outwardly extending dome portion of the cover plate has a diameter that is less than a diameter of the second weld face of the second welding electrode.

8. The method set forth in claim 7, wherein the outwardly extending dome portion is spherically shaped with a radius of curvature that ranges from 4 mm to 12 mm.

9. The method set forth in claim 1, wherein the cover is constructed from a copper material.

10. The method set forth in claim 1, wherein each of the set of aluminum-to-aluminum spot welds, the set of aluminum-to-steel spot welds, and the set of steel-to-steel spot welds is formed throughout a unitary body-in-white structure of an automotive passenger vehicle.

11. The method set forth in claim 1, further comprising periodically restoring each of the first weld face of the first welding electrode and the second weld face of the second welding electrode.

12. The method set forth in claim 1, wherein inserting the cover comprises rotating an arm that carries the cover about a pivot axis to bring the cover into an inserted position in which the cover is located between the second weld face of the second welding electrode and the second side of the workpiece stack-up.

13. The method set forth in claim 1, further comprising:
    forming another set of aluminum-to-steel spot welds in the one or more workpiece stack ups that includes an aluminum workpiece and an adjacent overlapping steel workpiece with the first and second welding electrodes before forming the set of aluminum-to-aluminum spot welds.

* * * * *